(12) United States Patent
Sandipher

(10) Patent No.: US 10,690,496 B2
(45) Date of Patent: Jun. 23, 2020

(54) LEVELLING DEVICE

(71) Applicant: Joseph D. Sandipher, Cincinnati, OH (US)

(72) Inventor: Joseph D. Sandipher, Cincinnati, OH (US)

(*) Notice: Subject to any disclaimer, the term of this patent is extended or adjusted under 35 U.S.C. 154(b) by 151 days.

(21) Appl. No.: 15/942,006

(22) Filed: Mar. 30, 2018

(65) Prior Publication Data

US 2019/0301862 A1    Oct. 3, 2019

(51) Int. Cl.
*G01C 9/28* (2006.01)
*G01V 3/08* (2006.01)

(52) U.S. Cl.
CPC ....... *G01C 9/28* (2013.01); *G01V 3/08* (2013.01)

(58) Field of Classification Search
CPC .................................. G01C 9/28; G01V 3/08
USPC .......................................................... 33/379
See application file for complete search history.

(56) References Cited

U.S. PATENT DOCUMENTS

| | | | | |
|---|---|---|---|---|
| 4,700,489 A * | 10/1987 | Vasile | ............... | G01B 3/566 33/342 |
| 5,222,303 A * | 6/1993 | Jardine | ............... | G01B 3/02 33/528 |
| 8,286,363 B1 * | 10/2012 | Martinez | ............... | G01C 9/26 33/451 |
| 2001/0034945 A1 * | 11/2001 | Smochek | ............... | G01C 9/26 33/373 |
| 2006/0123645 A1 * | 6/2006 | Gorgone | ............ | E04G 21/1808 33/451 |
| 2006/0265895 A1 * | 11/2006 | Daugherty | ............... | B43L 7/00 33/613 |
| 2012/0110864 A1 * | 5/2012 | Murray | ............... | G01C 9/02 33/301 |
| 2012/0246957 A1 * | 10/2012 | Daniel | ............... | A47G 1/205 33/645 |
| 2019/0301862 A1 * | 10/2019 | Sandipher | ............... | G01V 3/08 |

* cited by examiner

*Primary Examiner* — Yaritza Guadalupe-McCall
(74) *Attorney, Agent, or Firm* — Theodore P. Cummings, Esq.; Cummings Law Firm

(57) ABSTRACT

The invention herein provides a leveling device that is attachable to a wall surface. More particularly, the leveling device herein comprises stud attachment members that are useful for attaching the leveling device to a wall surface thereby enabling the placement of tile onto a wall in a straight line.

13 Claims, 4 Drawing Sheets

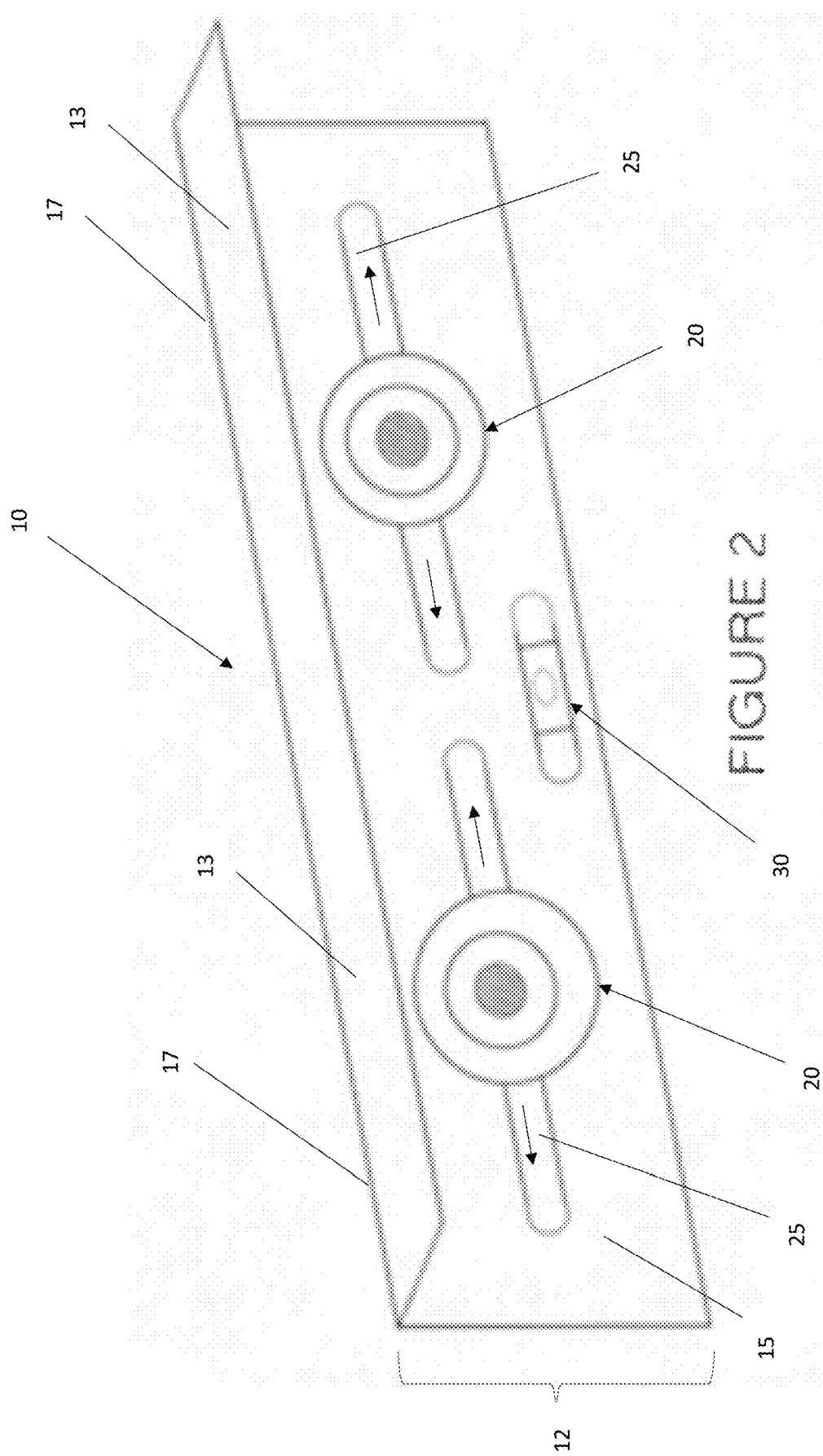

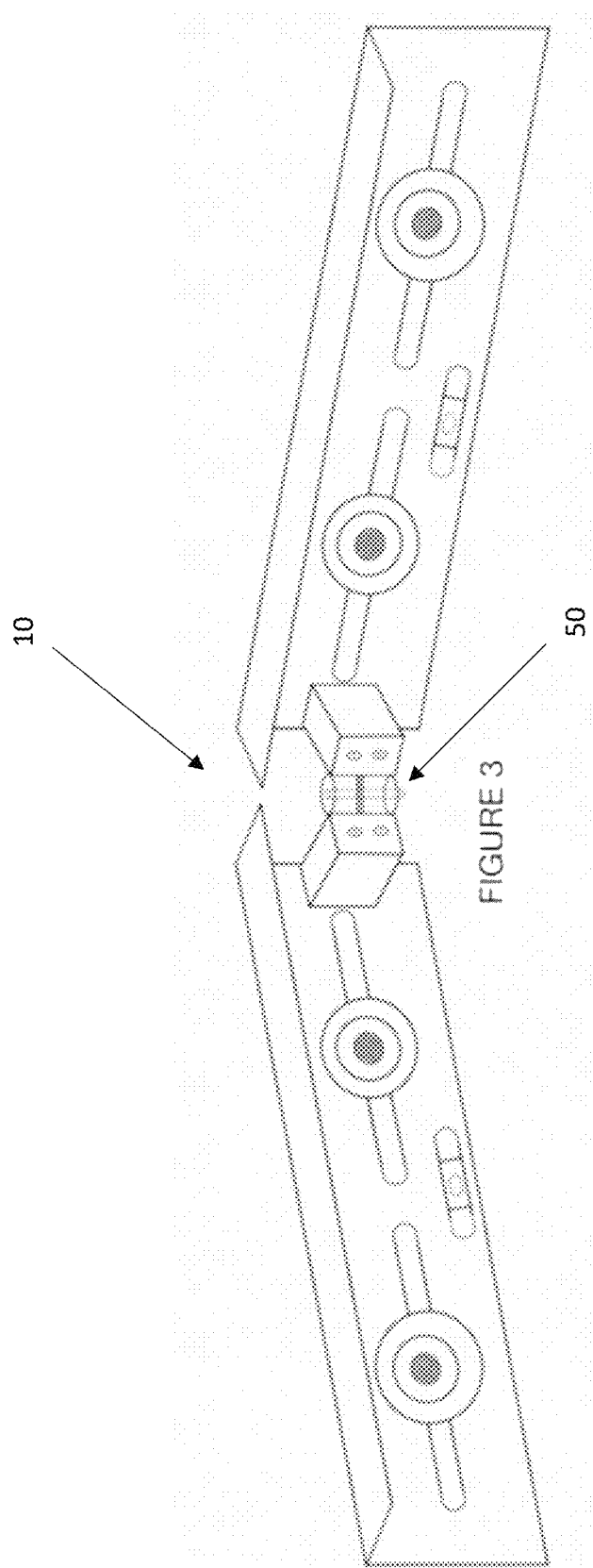

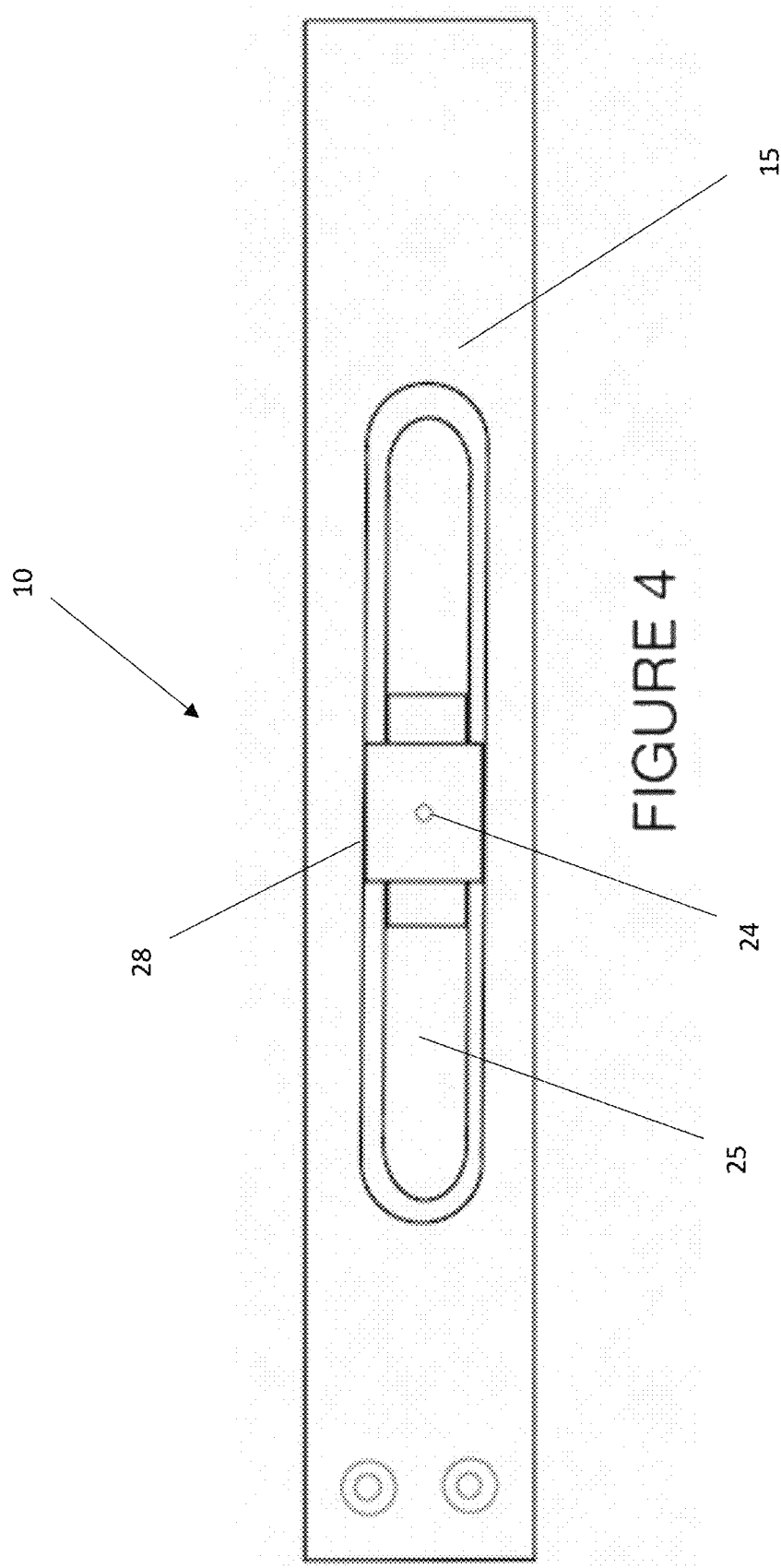

LEVELLING DEVICE

FIELD OF THE INVENTION

The invention herein provides a leveling device that is attachable to a wall surface. More particularly, the leveling device herein comprises stud attachment members that are useful for attaching the leveling device to a wall surface thereby enabling the placement of tile onto a wall in a straight line.

BACKGROUND OF THE INVENTION

Builders throughout antiquity have created and used various tools to build various kinds of structures including homes, buildings, temples, churches and various other kinds of buildings. Artisans too have sought to decorate these structures for utilitarian and purely decorative purposes.

As these structures have become more complex and as mankind has advanced, these tools have increased in sophistication, complexity and cost. In modern times, professionals and do-it-yourselfers (DIYs) spend top dollar (or other currency) on tools from hardware stores, big box stores and the like to complete projects to add utility and beauty.

Any homeowner who has ever remodeled a bathroom or kitchen well understands the necessity of having tools that can make the job easier while providing desired, accurate results. For professionals, sturdy tools that provide accuracy, fit and finish are often the difference between completing a job or being fired from a job. For DIYers, proper tools are critical to homeowners seeking to save money and time on their home projects.

For certain kinds of renovations in kitchens and bathrooms, use of levelers to hang tile, other ornamental wall hung materials (e.g., wood, composite materials and the like), place windows or openings, hang shelves, hang wall-mounted televisions is well known. Such leveling tools have existed since ancient times. What has not existed are levels that can also serve as guides upon which to build or instruments by which to find wall mounts (e.g., studs in walls) to aid the building process. To these ends has this invention been brought and for the solving of the problems described herein.

SUMMARY OF THE INVENTION

Accordingly, the invention provides a leveling tool that comprises an L-shaped member that has a wall portion and a tile portion connected to said wall portion. The wall portion and the tile potion of the leveling tool share an edge of connection thereby forming the L-shape of the leveling tool.

There is at least one level indicator positioned onto the L-shaped member. The level indicator is used to find a straight line on at least one movable stud attachment member positioned onto the wall portion of the leveling tool. The movable stud attachment member is slidably movable across the wall portion in a recessed channel. The stud attachment member can be easily moved from one section of the L-shaped member within the recessed channel in left and right lateral directions.

The leveling tool provides that its wall portion is held against a wall surface. The tile portion herein is configured for the level application of tile to a wall surface. The leveling tool's level indicator indicates the in-level or out of level condition of the leveling tool.

In practice, the leveling tool's movable stud attachment members provide a cavity whereby a screw is positioned within said cavity to screw into a wall surface. Once a stud attachment member is aligned to a stud, a screw, nail or other attachment means may be loaded into the cavity thereof and screwed, nailed or otherwise fitted to an underlying stud for attachment.

In additional, alternative practice, the leveling tool further comprises at least one stud finder. The stud finder is attached to each movable stud attachment member. In best practice, the at least one stud finder is electronic. It emits an audible tone to indicate the location of a hidden stud within a wall. In another embodiment herein, the at least one stud finder emits a visual signal to indicate the location of a hidden stud with a wall.

In another preferred embodiment herein, the leveling tool comprises a hinged member that is used as part of the leveling tool at a corner of a wall. The hinged member comprises at least one stud attachment member. Also, the hinged member enables attachment of the leveling tool to a corner of a wall using at least one movable stud attachment member.

Leveling tool herein provides several important functions: [JD PARAGRAPH]

BRIEF DESCRIPTION OF THE FIGURES

The various exemplary embodiments of the present invention, which will become more apparent as the description proceeds, are described in the following detailed description in conjunction with the accompanying drawings, in which:

FIG. 2 is a perspective view of the leveling device of FIG. 1; and

FIG. 3 is an alternative perspective view of the leveling device of FIG. 1; and FIG. 4 is a rear view of the leveling device of FIG. 1.

DETAILED DESCRIPTION OF THE INVENTION

Figure 1:
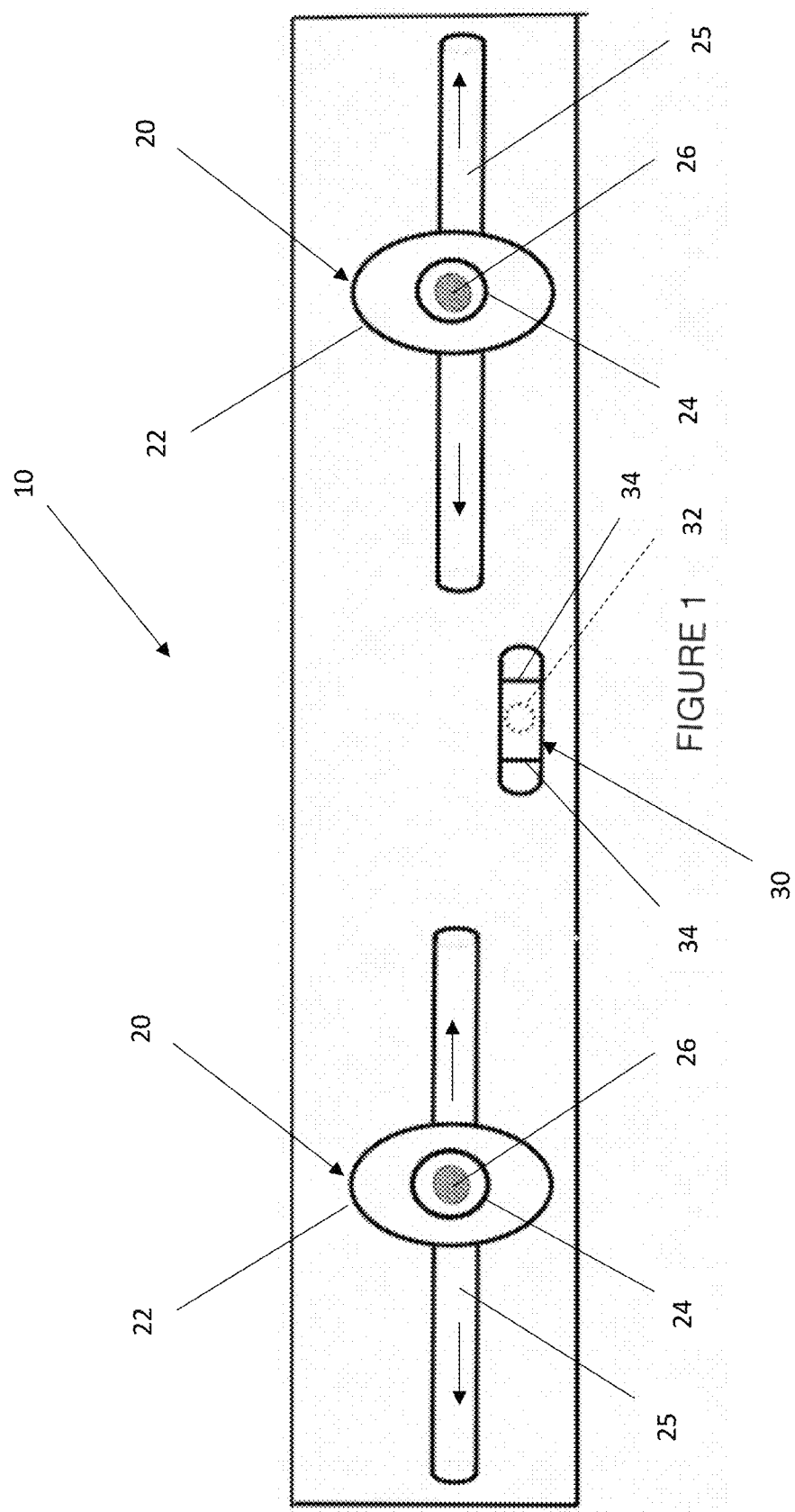
FIG. 1 is a front planar view of the leveling device herein.

By the term "wall surface", it is meant herein a wall having a wall's surface thereon or a naked stud upon which the leveler herein may be attached.

The invention herein provides a leveling tool that comprises an L-shaped member that has a wall portion and a tile portion connected to the wall portion. The wall portion and the tile potion of the leveling tool share an edge of connection thereby forming the L-shape of the leveling tool.

There is at least one level indicator positioned onto the L-shaped member. The level indicator is used to find a straight line on at least one movable stud attachment member positioned onto the wall portion of the leveling tool. The movable stud attachment member is slidably movable across the wall portion. The stud attachment member can be easily moved from one section of the L-shaped member within its assigned recessed channel in left and right lateral directions.

The leveling tool provides that its wall portion is held against a wall surface. The tile portion herein is configured for the level application of tile to a wall surface. The leveling tool's level indicator indicates the in-level or out of level condition of the leveling tool.

In practice, the leveling tool's movable stud attachment members provide a cavity or sleeve whereby a screw is positioned within said cavity or sleeve to screw into a wall surface. Once a stud attachment member is aligned to a stud, a screw, nail or other attachment means may be loaded into the cavity thereof and screwed, nailed or otherwise fitted to an underlying stud for attachment.

In additional, alternative practice, the leveling tool further comprises at least one stud finder. The stud finder is attached to each movable stud attachment member. In best practice, the at least one stud finder is electronic. It emits an audible tone to indicate the location of a hidden stud within a wall. In another embodiment herein, the at least one stud finder emits a visual signal to indicate the location of a hidden stud with a wall.

In another preferred embodiment herein, the leveling tool comprises a hinged member that is used as part of the leveling tool at a corner of a wall. The hinged member comprises at least one stud attachment member. Also, the hinged member enables attachment of the leveling tool to a corner of a wall using at least one movable stud attachment member.

FIG. 1 provides a planar view of leveling tool 10 (also, "leveler 10"). Leveling tool 10 has the ability to be applied to a surface, e.g., a wall, one or more naked studs, and other surfaces, in order to apply items to the surface that require accurate, precise location. FIG. 1 shows two movable stud attachment members 20. Each stud attachment member 20 slidably affixed within recessed channel member 25.

Leveling tool 10 comprises L-shaped member 12 (FIG. 2). L-shaped member 12 has wall portion 15 and tile portion 13 connected to wall portion 15. Wall portion 15 and tile portion 13 are connected about connecting edge 17 whereby the connection of wall portion 15 and tile portion 13 form the L-shaped leveling tool 10.

Recessed channel member 25, as shown in FIG. 1, is positioned horizontally within wall portion 15. It is preferably oblong shaped to allow a stud attachment member 20 to fit therein. In view, recessed channel member 25 extends through wall portion 15 of leveling tool 10. In practice, stud attachment members 20 move freely along recessed channel members 25. To be clear, best practice of the invention herein allows for one stud attachment member 20 to be placed within one recessed channel member 25. Each stud attachment member 20 uses recessed channel 25 to align itself to a point of attachment on a wall surface or kind of surface (e.g., kitchen counter, table, and the like).

Each stud attachment member 20 comprises a contact surface 22 for the human hand. As shown, contact surface 22 is circular and built to fit within the fingers and/or hand of a user. Contact surface 22 may be turned in a circular direction, either to the left or to the right. If turned to the left, contact surface 22 tightens itself in place along recessed channel member 25. If turned to the right, contact surface 22 loosens itself from a tightened position along recessed channel member 25.

Each stud attachment member 20 also comprises an opening 24. Opening 24 pierces through stud attachment member 20 and therefore also through wall portion 15 of leveler 10. Opening 24 of stud attachment member 20 enables a screw, nail or other attachment means to readily slide (or screw) within opening 24 and attach to a surface, e.g., a wall surface. Persons of skill in the art will readily recognize that opening 24 can be made in a suitable diameter depending upon the diameter of screw or nail to be used within stud attachment member 20. Importantly, whatever attachment means are used (e.g., screw, nail, or other suitable means), the head of such attachment means does not push through the opening but instead is affixed within the opening thereby also affixing leveling tool 10 to a wall or other surface. Shaded area 26 represents the end side of leveler 10. Like opening 24, shaded area 26 is a hole, i.e., end hole 26. Opening 24 and end hole 26 are aligned and form the terminal ends of a straight cylinder (not shown) that enables a nail or screw to affix to a wall or wall surface straightly.

Level indicator 30 is also shown in FIG. 1. Level indicator 30 enables a user to determine when a level surface has been achieved by leveling tool 10. This is achieved by use of a fluid encased within level indicator 30 and an object 32 or gas/air bubble that floats within the fluid. Two leveling lines 34 are used to determine when a level surface has been achieved by a user. When object 32 balances between leveling lines 34 and does not move over one leveling line 34 or another, a level surface can reasonably be said to be have been achieved. If object 32 is not positioned between leveling lines 34, that is an indication that leveling tool 10 is not level and a user should adjust it until a level surface is achieved.

FIG. 2 provides a perspective view of leveling tool 10 of FIG. 1. This view more clearly shows some of the key features of leveling tool 10. For example, L-shaped member 12 comes more solidly into view. Also, tile portion 13, i.e., the part of leveling tool 10 upon which tile or some other wall-attachable item, is featured as well as wall portion 15, i.e., the part of leveling tool 10 that abuts against a wall or other surface for the setting of tile or some other wall-attachable item.

In practice, stud attachment members 20 move along recessed channel members 25 in either direction of the arrows shown. The left and right arrows placed within recessed channel members 25 show the left and right directions in which stud attachment members 20 may move. Such motion enables the stud attachment members 20 to align to either a solid part of a wall or surface or a stud found beneath drywall or plaster. Once alignment is achieved, a screw or nail may be applied through stud attachment member 20 to secure leveling tool 10 to the wall. Preferably, a screw is used due to its ease of removal once the work of leveling tool 10 is complete; i.e., after tile (or some similar material) has been attached to a wall or other surface.

In another embodiment herein, leveling tool 10 comprises a digital stud finding tool (not shown). The digital stud finder used herein may be of either the magnetic or electronic type. Magnetic stud detectors use magnets to locate metal in the walling material because the magnet is attracted to the metal. The attraction grows stronger as the magnet gets closer to the metal in the walling. The strongest attraction point, if due to a metal fastener in the wall, should indicate the location of a stud, but careless wall construction can leave many metal fasteners off the studs or towards the edge, rendering the spot useless for anchoring objects. Magnetic stud detectors come in two types: stationary and moving. Electronic stud finders rely on sensors that detect changes in the dielectric constant of the wall. The dielectric constant changes when the sensor is over a stud. The lower reading indicates the presence of a stud in the wall. Internal capacitor stud finders can also come with other features that locate metal and live AC voltage.

Whichever stud finder type is used, its placement is within leveling tool 10 and preferably within stud attachment member 20 since its location should be made at a hidden stud beneath a wall. Modern electronics enable the ability to micronize the components necessary to attach and/or place the stud finder electronic components to or within leveling tool 10. Persons of skill will well understand and appreciate the ability to add the key components for either the magnetic or electronic types of stud finders.

Stud finders of the type contemplated herein are manufactured by DEWALT®, ZIRCON®, BLACK & DECKER®, CH HANSON® and the like. Persons of skill will readily recognize and understand the use of stud finder technology contemplated herein and apply it based upon that understanding.

FIG. 3. Provides yet another alternative embodiment of leveling tool 10. In it, leveling tool 10 is shown in two parts that are connected by bracket 50. Bracket 50 connects two parts of leveling tool 10 while also enabling the combined tool to be used on two separate parts of a surface, e.g., two parts of a wall that meet at an edge. This configuration of leveling tool 10 is highly useful as it enables placement of tile and other wall-mountable materials to be placed on two separate yet joining wall (or other) surfaces without interruption of that work for leveling from one surface to another.

In practice, the left side of leveling tool 10 is placed upon a left wall or wall surface while the right side of leveling tool 10 is placed upon a right wall whereby the left and right wall meet at an edge. One side of leveling tool 10 is affixed to a wall or wall surface once it is found to be level by the means provided hereinabove. Once one side of leveling tool 10 is affixed, the other side is then affixed. Once level and both sides of leveling tool 10 affixed, tile or some other suitable material may be affixed to a wall or other surface as appropriate.

Leveling tool 10 may be constructed in various lengths. Manufacturers of skill will readily understand that contractors and consumers will desire leveling tool 10 constructed to fit differently lengthed walls and wall surfaces. Leveling tool 10 can be constructed in lengths ranging from one foot to eight feet with or without use of hinged member 50. If hinged member 50 is used, leveling tool 10 may be longer than the eight feet proscribed.

Leveling tool 10 may be made from various materials well known by persons of skill. These materials include steel, iron, aluminum, aluminum alloys, alloys of aluminum and steel, polyethylene, polypropylene, any of the 'hard', moldable plastics known in the art, wood, wood composites and the like. It is important to note that whatever materials that are used by manufacturers that certain principles are maintained in the construction of leveling tool 10. One principle is that leveling tool 10 be able to provide a straight edge upon which tile or some other similar material may rest. Another principle is that leveling tool 10 is adherable to a wall or like surface. Yet another principle in the manufacture of leveling tool 10 is that whatever materials or composites thereof are used are durable and that they maintain their original specifications over time regardless of exposure to varying temperatures, moisture levels and accidental harm like drops.

FIG. 4 shows the back of leveling tool 10. The back of leveling tool 10 is the portion thereof that is placed against a wall, wall surface, studs and the like. Also shown in FIG. 4 is recessed channel member 25 in which movable stud attachment member 20 resides. The back of stud attachment member 20 is provided in which opening 24 is shown. Square member 28 juts out some distance from the back of leveling tool 10 and may contain the electronics necessary to find a stud for attachment thereto. In this manner, as noted hereinabove, stud attachment member 20 may also serve as a stud finder tool in addition to being the mechanism by which leveling tool 10 is attached to a wall surface.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A leveling tool, comprising:
   a. An L-shaped member, said L-shaped member having a wall portion and tile portion connected to said wall portion, said wall portion and said tile portion connected about a connecting edge whereby said connection of said wall portion and said tile portion form an l-shape;
   b. At least one level indicator positioned onto said wall portion of said L-shaped member;
   c. At least one recessed channel member positioned horizontally onto said wall portion of said L-shaped member;
   d. At least one stud finder positioned into said leveling tool; and
   e. At least one movable stud attachment member positioned within said at least one recessed channel member, each said movable stud attachment member being slidably affixed said recessed channel member, each said movable stud attachment member being movable across said wall portion through said at least one recessed channel member.

2. The leveling tool of claim 1 wherein said wall portion is holdable against a wall surface.

3. The leveling tool of claim 1 wherein said tile portion is configured for the level application of tile to a wall surface.

4. The leveling tool of claim 1 wherein said level indicator indicates the in-level or out of level condition of said leveling tool.

5. The leveling tool of claim 1 wherein each said one movable stud attachment member provides a cavity whereby a screw is positioned within said cavity to screw into a wall surface.

6. The leveling tool of claim 5 wherein said screw is positionable within said cavity to screw into a wall stud.

7. The leveling tool of claim 1 wherein each said at least one stud finder is attached to each said movable stud attachment member.

8. The leveling tool of claim 1 wherein said at least one stud finder is electronic.

9. The leveling tool of claim 8 wherein said at least one stud finder emits an audible tone to indicate the location of a hidden stud within a wall.

10. The leveling tool of claim 8 wherein said at least one stud finder emits a visual signal to indicate the location of a hidden stud with a wall.

11. The leveling tool of claim 1 wherein said leveling tool comprises a hinged member, said hinged member being used as part of said leveling tool at a corner of a wall.

12. The leveling tool of claim 11 wherein said hinged member comprises at least one stud attachment member.

13. The leveling tool of claim 12 whereby said hinged member enables attachment of said leveling tool to a corner of a wall using at least one said movable stud attachment member.

* * * * *